United States Patent [19]

Sugita

[11] Patent Number: 5,438,596
[45] Date of Patent: Aug. 1, 1995

[54] METHOD AND APPARATUS FOR GENERATING DIFFUSION CODE

[75] Inventor: Takehiro Sugita, Kanagawa, Japan

[73] Assignee: Sony Corporation, Tokyo, Japan

[21] Appl. No.: 288,333

[22] Filed: Aug. 10, 1994

[30] Foreign Application Priority Data

Aug. 10, 1993 [JP] Japan .................. 5-198460

[51] Int. Cl.⁶ .................. H04B 1/69; G06F 1/02
[52] U.S. Cl. .................. 375/200; 380/34; 380/46; 331/78; 364/717
[58] Field of Search .................. 375/1; 380/34, 46; 331/78; 364/717

[56] References Cited

U.S. PATENT DOCUMENTS

| | | | |
|---|---|---|---|
| 4,685,132 | 8/1987 | Bishop et al. | 380/46 |
| 4,785,410 | 11/1988 | Hamatsu et al. | 364/717 |
| 4,847,861 | 7/1989 | Hamatsu et al. | 375/1 |
| 4,928,310 | 5/1990 | Goutzoulis et al. | 380/46 |
| 4,959,832 | 9/1990 | Bardell, Jr. | 364/717 X |
| 5,031,130 | 7/1991 | Harada | 364/717 |
| 5,111,416 | 5/1992 | Harada | 364/717 |

Primary Examiner—Bernarr E. Gregory
Attorney, Agent, or Firm—Limbach & Limbach; Philip M. Shaw, Jr.

[57] ABSTRACT

A method and apparatus for generating the PN code employed for spread spectrum communication are disclosed. Maximal period sequence signals from a maximal period sequence generator 11 and shift vector from a shift vector outputting circuit 10 are transmitted to a vector multiplier 12 for vector multiplication. Outputs of the vector multiplier 12 are transmitted directly to a selector 14 and via a one-chip delay flipflop 13 to the selector 14. The selector 14 is changed over at an externally set control timing. The PN code employed in a CDMA system Cellular may be arbitrarily time-shifted using the vector multiplication so that changeover between transmitting base stations desired to be received may be achieved in a shorter time using a simplified circuit construction.

6 Claims, 7 Drawing Sheets

ORDINARY MAXIMAL PERIOD SEQUENCE

PN CODE SEQUENCE FOR CDMA CELLULAR

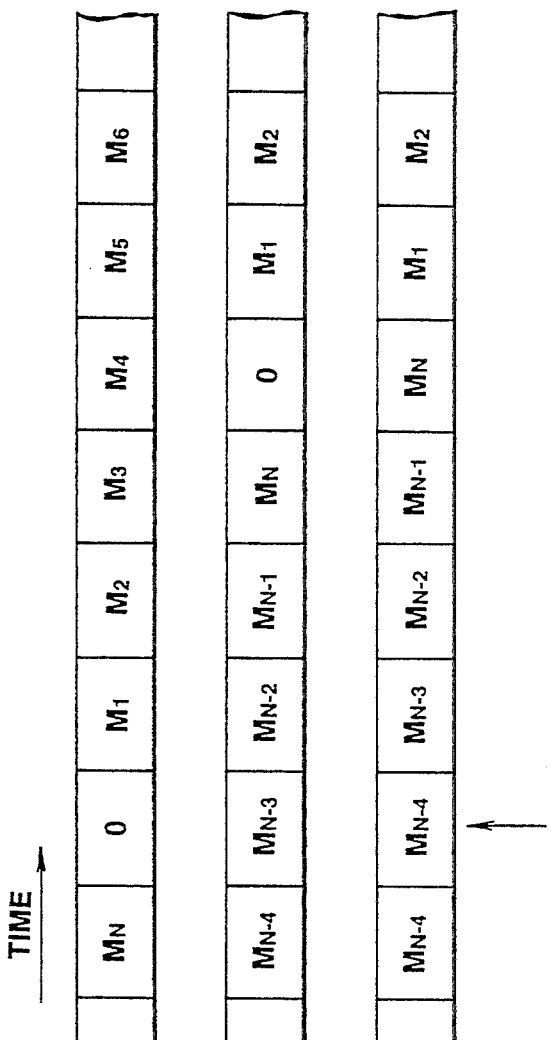

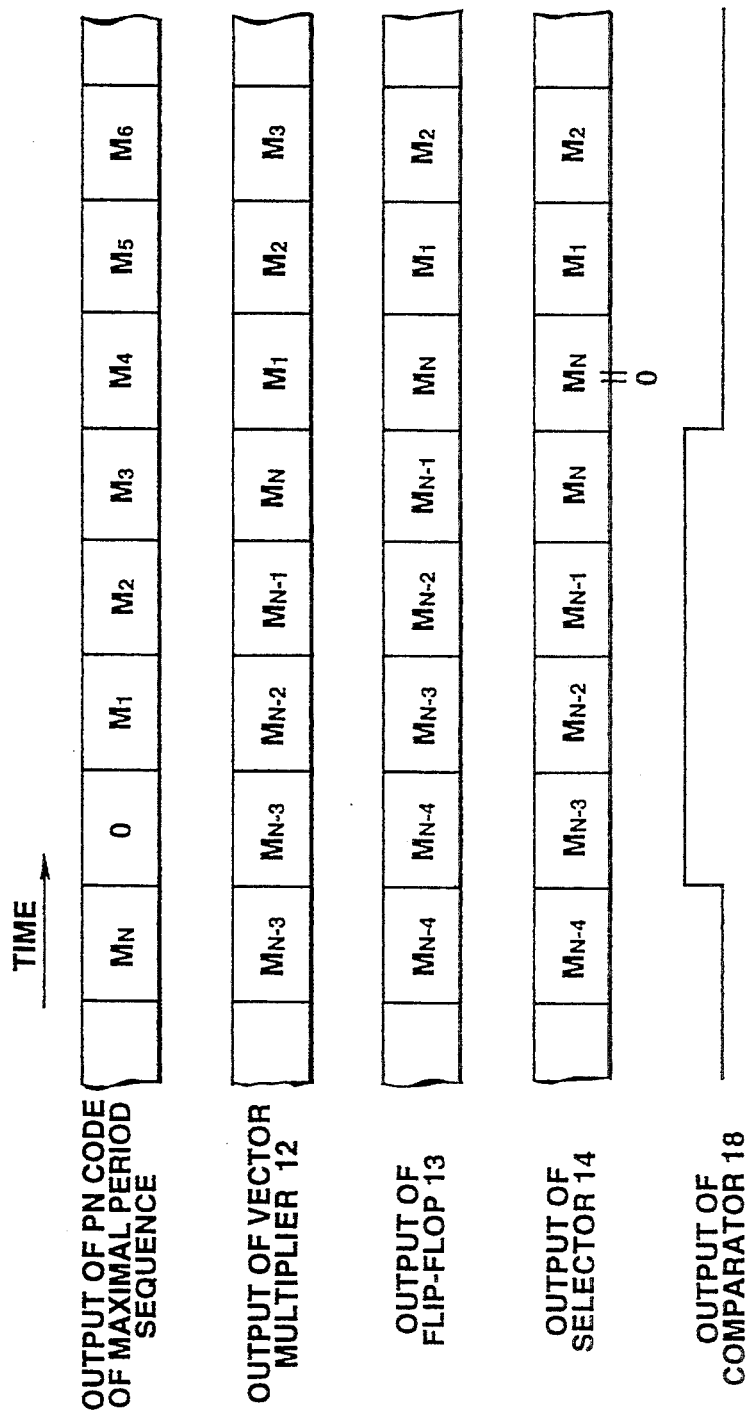

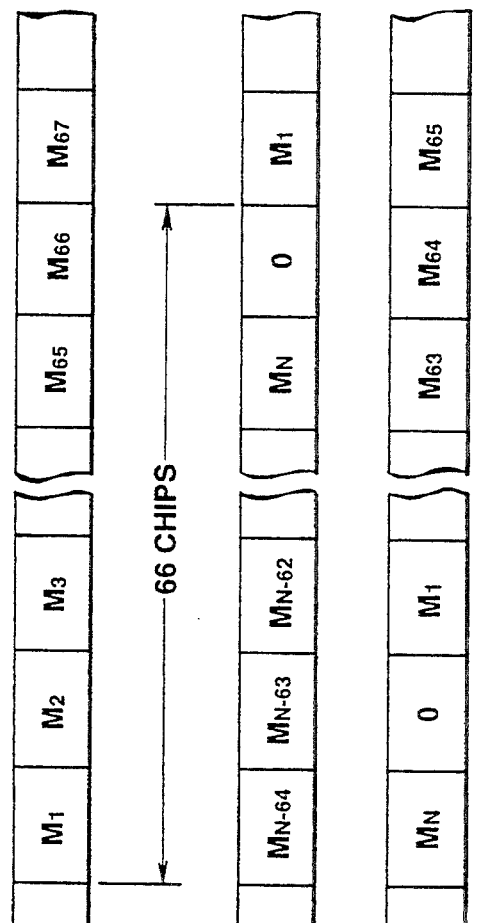

METHOD AND APPARATUS FOR GENERATING DIFFUSION CODE

BACKGROUND OF THE INVENTION

This invention relates to a method and apparatus for generating the pseudo noise code (PN code) employed for spread spectrum communication. More particularly, it relates to a PN code generating method and apparatus for detecting the timing of the PN code of the spread spectrum of the direct spread spectrum system in a receiver employed in a moving terminal of a so-called code division multiple access (CDMA) system digital Cellular and effecting an inverse operation for received signals.

In the spread spectrum communication system, the carrier wave is modulated (diffused) by pseudo noise (PN) code series at a transmitter side such as a base station and baseband demodulated to produce data after the correlation (inverse operation of spreading) process at a receiver such as a moving terminal using the PN code generated by the PN code generator having the same construction as that at the transmitter.

With the so-called CDMA system Cellular, which is a kind of the spread spectrum communication system, plural acceptable signals from among a number of signals transmitted from the same base station over multiple pass channels are utilized by way of bus diversity or RAKE reception, or plural signals transmitted form plural base stations are received simultaneously (soft hand off).

Since the base stations having high signal intensities are selected and received during soft hand off, an operation of changing over the base stations used for demodulation is frequently carried out within the receiver. Thus it is crucial to shorten the time which elapses since detection of the signal from a base station having a higher signal intensity than that of the currently received signal from another base station until actual reception of the higher intensity signal, that is the time necessary for switching from the signals of a base station to signals of another base station, in order to receive stronger signals more quickly and to enable them to be utilized for a longer time period.

In order to synchronize a PN sequence within a moving terminal to that in the base station, a PN sequence generator is advanced by being operated at a higher rate, or retarded by being operated at a lower rate or halted.

This method has however a drawback that a lot of time is required until synchronization is achieved. In the case of the CDMA system Cellular, the period of PN code is approximately 27 ms, so that a time period of 3.8 ms is required even if the rate of operation of the generator is increased by a factor of 7. For providing the 7-fold rate of operation, a number of clocks eight times as many as that for the PN code is necessitated. However, this rate cannot be increased infinitely because of the constraint imposed on the operating speed of various devices employed in the Cellular. There is also a fear that the power consumption is increased.

SUMMARY OF THE INVENTION

In view of the above-described status of the prior art, it is a principal object of the present invention to provide a method and apparatus for generating a PN code whereby it becomes possible to reduce the time required in switching a receiver with respect to signals transmitted from different transmitting stations.

The present invention provides a method for generating a PN code for spread spectrum communication comprising a maximal period sequence generating step of generating a maximal period sequence which is to be the base of the PN code and in which a code 0 is inserted at some position in the sequence, a vector producing step of finding the delay time of the PN code required in the spread spectrum communication as a shift vector value, a first maximal period sequence outputting step of multiplying the vector having the state of each register of the maximal period sequence generating step by the shift vector for outputting the temporally shifted first maximal period sequence, a second maximal period sequence outputting step of outputting a second maximal period sequence delayed further by one PN rate from the first maximal period sequence, and a selecting step of outputting a PN code by changing over the first maximal period sequence to the second maximal period sequence or vice versa at a timing as set from outside.

The present invention also provides an apparatus for generating a PN code for spread spectrum communication comprising maximal period sequence generating means for generating a maximal period sequence which is to be the base of the PN code and in which a code 0 is inserted at some position in the sequence, vector producing means for finding the delay time of the PN code required in the spread spectrum communication as a shift vector value, first maximal period sequence outputting means for multiplying the vector having the state of each register of the maximal period sequence generating step by the shift vector for outputting the temporally shifted first maximal period sequence, second maximal period sequence outputting means for outputting a second maximal period sequence delayed further by one PN rate from the first maximal period sequence, and selecting means for outputting a PN code by changing over the first maximal period sequence to the second maximal period sequence or vice versa at a timing as set from outside.

Preferably, only the vector corresponding to the time difference of PN codes transmitted from plural transmitting stations are stored and read out for producing the vector. Also preferably, fine adjustment for the propagation delay produced from the transmitting side to the receiving side is made by advancing or retarding the generation of the maximal period sequence.

In the spread spectrum communication system, such as the so-called CDMA system Cellular, it has hitherto been known to achieve temporal shift by multiplying a vector having the status of each register employed in the maximal period sequence generator as the PN code as an element by another vector. However, the PN code of the CDMA system Cellular cannot be directly applied because of "0" insertion at the ultimate stage in order to provide a code length equal to $2^n$. The present invention provides means for effecting time shifting using vector multiplication despite such "0" insertion and means for correcting for time difference in the PN sequence between different base stations for achieving fine adjustment for compensating propagation delays produced from the base stations as far as the moving station by actually advancing and/or retarding the maximal period sequence generator.

By changing over an output of the first maximal period sequence to an output of the second maximal period sequence or vice versa for outputting the PN code, temporal adjustment of the PN code may be achieved using vector multiplication in the PN code of the CDMA system Cellular which is a modified form of the maximal period sequence. This significantly diminishes the time involved in temporal adjustment of the PN code.

Although temporal correction may be achieved in an extremely short time, a larger number of vector values need to be provided for generating timings in their entirety. Thus the adjustment by this technique is employed for time difference adjustment of the PN code between the base stations, while the technique of actually advancing and/or retarding the maximal period sequence generator is employed for delay correction based on the propagation time difference produced between each base station and the moving terminal. By employing vector multiplication only for time correction having a larger temporal correction volume between the base stations, it becomes possible to reduce the time required for synchronizing the sequences during base station switching while maintaining a smaller actual circuit scale.

In other words, by employing the technique of vector multiplication for correcting the time difference of the PN codes between plural transmitting sides, for example, plural base stations, and employing conventional means of advancing or retarding the PN code generator for correcting the time difference caused by different propagation delay time from the different base stations, the number of vectors to be in use may be diminished and the time required in achieving temporal shift of the PN code may be shortened without excessively increasing the circuit scale.

BRIEF DESCRIPTION OF THE DRAWINGS

FIGS. 5A through 5C are diagrammatic views for illustrating the difference in the result between a signal delayed by 4 chips from the PN code of the CDMA system Cellular and the result obtained with simple vectorial multiplication.

FIGS. 7A through 7E are diagrammatic views illustrating the circuit operation in the block diagram of FIG. 1.

FIGS. 8A through 8C are diagrammatic views illustrating the time difference in the PN code between different base stations.

DESCRIPTION OF THE PREFERRED EMBODIMENTS

Figure 1:
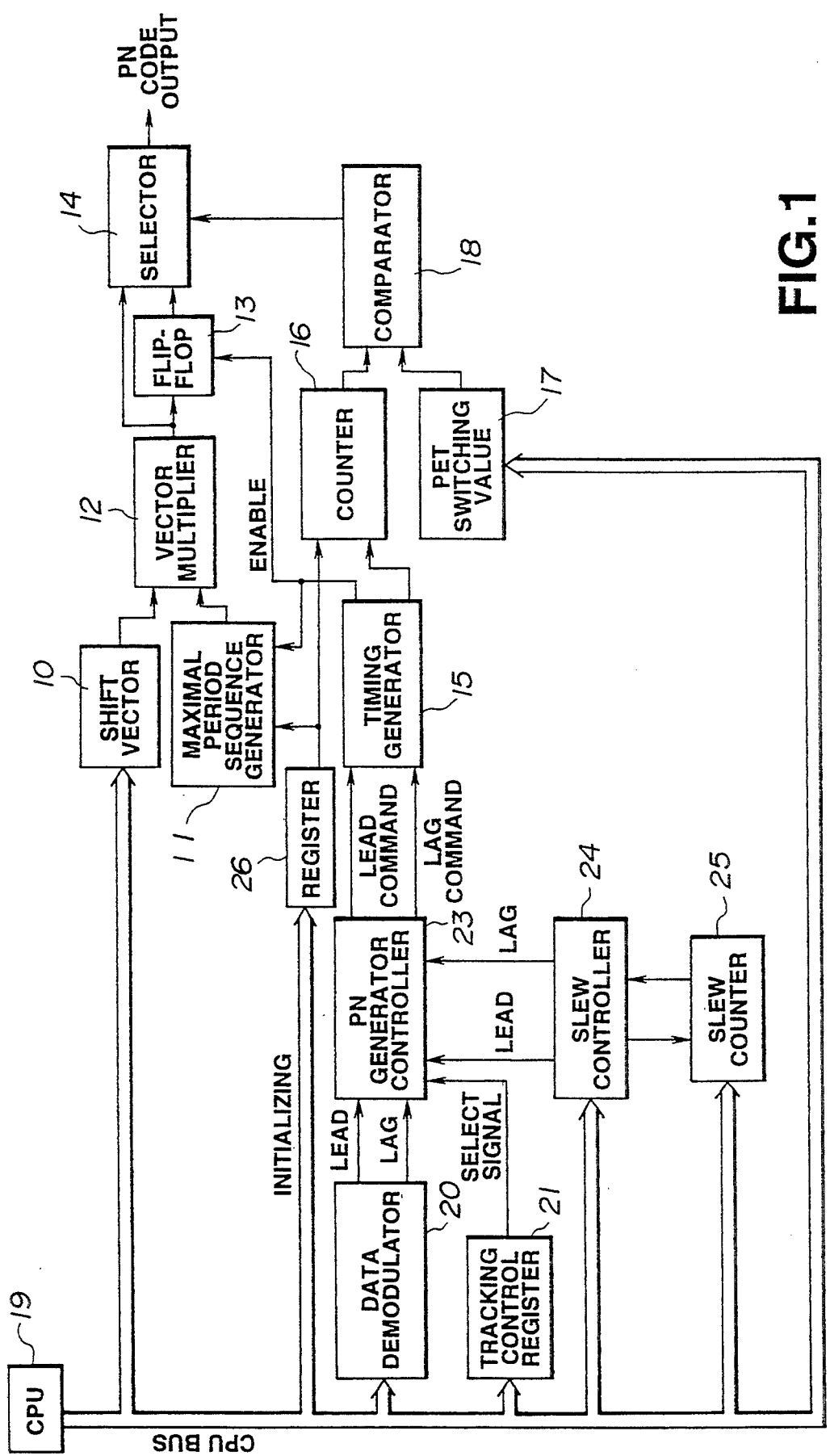
FIG. 1 is a block diagram showing an embodiment of the present invention.

Referring to the drawings, preferred embodiments of the present invention will be explained.

FIG. 1 shows an arrangement of a PN code generator employed in the spread spectrum communication, as an embodiment of the present invention.

Figure 2:
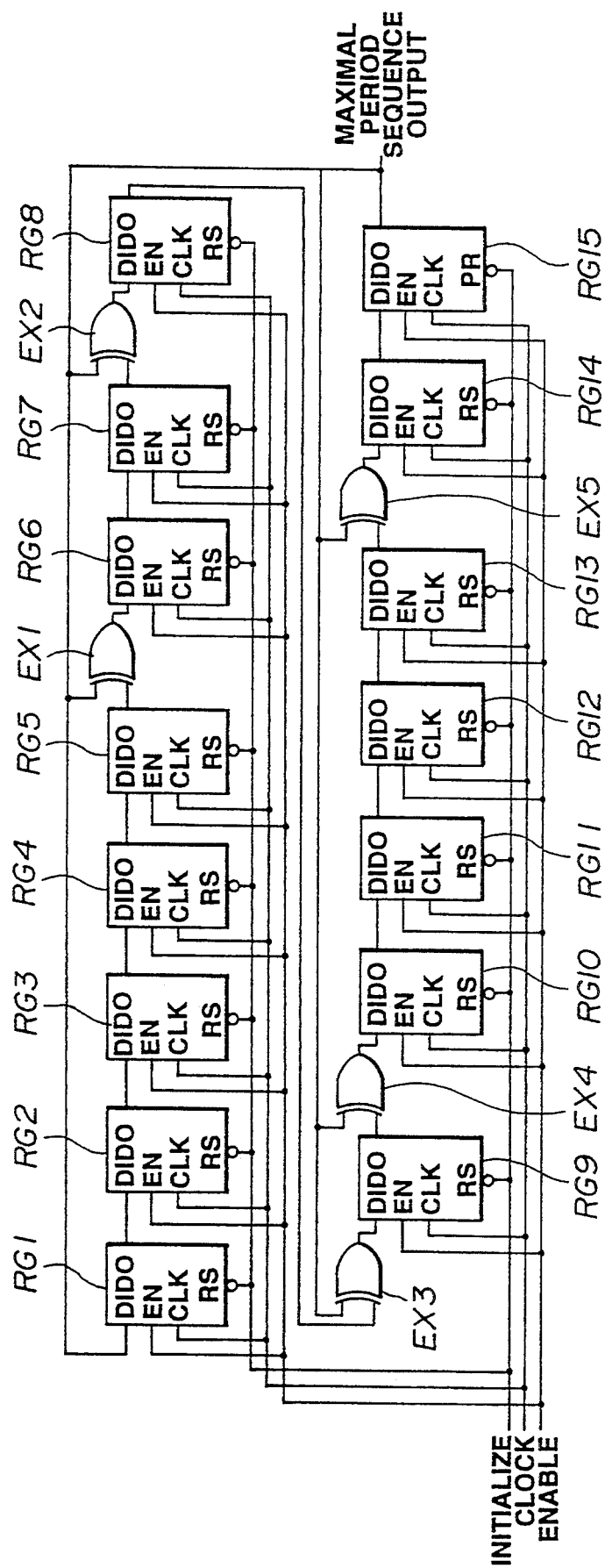
FIG. 2 shows an example of a maximal period sequence generator employed in a so-called CDMA system Cellular.

Referring to FIG. 1, a maximal period sequence generator 11, as a pseudo-random number generator, having an arrangement shown for example in FIG. 2, may be employed. The circuit shown in FIG. 2 is a simple customary maximal period sequence generator which will be explained subsequently in detail.

Referring to FIG. 1, it is detected by a data demodulator 20 whether the current data demodulating timing leads or lags the data receiving timing and the lead/lag information is outputted to a PN generator controller 23. Two output lines of the data demodulator are used for transmitting both the lead/lag information and the information indicating the timing coincidence.

To a tracking control register 21, there is entered from a CPU 19 over a CPU bus a command signal indicating whether or not tracking control is to be carried out. The command signal is entered as a selection signal to the PN generator controller 23.

To a slew controller 24, there is entered from the CPU 19 over the CPU bus a command signal indicating whether a lead adjustment is to be made in maximal period sequence generation or a lag adjustment is to be made in maximal period sequence generation, and the corresponding lead/lag information is entered to the PN generator controller 23.

The adjustment time is commanded by a slew counter 25 to the slew controller 24.

The PN generator controller 23 selects, based upon the selection signal from the tracking control register 21, one of the lead/lag information from the data demodulator 20 and the lead/lag information from the slew controller 24. That is, if tracking control is to be performed, the lead/lag information from the data demodulator 20 is selected, whereas, if tracking control is not made, the lead/lag information from the slew controller 24 is selected. In other words, the information from the data demodulator 20 is selected during data demodulation and the lead/lag information from the slew demodulator 24 is selected otherwise. The PN generator is controlled by such lead/lag information.

To a shift vector outputting unit 10, there is entered the information from the CPU 10 over the CPU bus the information as to which shift vector is to be outputted and such vector is outputted from the shift vector outputting unit 10. In the present embodiment, the shift vectors are stored in the vector outputting unit 10. However, in order to achieve the saving of the memory capacity for the vector outputting unit 10 to store 512 vectors, the shift vectors from the CPU 19 may be transmitted to and stored in the vector outputting unit 10 over the CPU bus.

In a set switching value memory 17, there are entered and stored pilot PN offset values associated with the shift vectors from the CPU 19 over the CPU bus.

To a register 26, there is entered an initializing signal from the CPU 19 over the CPU bus. The initializing signal is entered to the register during power-up time for synchronizing the maximal period sequence generator 11 and a counter Examples of the pilot-PN delay vectors (512 vectors) are partially shown in the following Table 1.

TABLE 1

| Pilot_PN<br>_Offset value | shift vector |
| --- | --- |
| 0 | 100000000000000 |
| 1 | 101111010100001 |
| 2 | 011000110001011 |
| 3 | 000011000001010 |
| 4 | 101011001011110 |
| 5 | 110111100011111 |
| 6 | 011010011001101 |
| 7 | 000010110001100 |
| 8 | 101101011011010 |
| 9 | 011010101101111 |
| 10 | 110110110111101 |
| 11 | 101001111101100 |
| 12 | 001000101010010 |
| 13 | 110001111111100 |
| 14 | 110001100110101 |
| 15 | 111011110101101 |
| 16 | 110101101111110 |
| 17 | 111010010001111 |
| 18 | 000101111010111 |
| 19 | 010111010100101 |
| 20 | 011110001111100 |
| . | . |
| . | . |
| . | . |
| 490 | 111010100000100 |
| 491 | 010000110000100 |
| 492 | 101110111010111 |
| 493 | 101101001101110 |
| 494 | 110100011011001 |
| 495 | 011010111010011 |
| 496 | 101101000010100 |
| 497 | 001001100111100 |
| 498 | 101100000001001 |
| 499 | 000010001110000 |
| 500 | 010100100111111 |
| 501 | 101110001110001 |
| 502 | 110110100101101 |
| 503 | 110111001101011 |
| 504 | 100010010001110 |
| 505 | 001000011001101 |
| 506 | 110100010011110 |
| 507 | 010110101100101 |
| 508 | 111000010101000 |
| 509 | 110111001100000 |
| 510 | 110100101010101 |
| 511 | 010110101001011 |

The shift vector outputting circuit 10 shown in FIG. 1 outputs vector values which are multiplied for effecting temporal shifting. An output of the shift vector outputting circuit 10 and an output of a maximal period sequence generator 11 are supplied to a vector multiplier 12 for vector multiplication. An output of the vector multiplier 12 is entered to both a selector 14 and a flip-flop 13 where a one-chip delay is produced. Each PN code is termed a chip and the PN code rate is termed a chip rate. The selector 14 is a circuit for selecting one of the output signal of the vector multiplier and a vector multiplier output signal which is delayed further by one chip.

A timing generator 15 is a circuit which affords the operating timings for the maximal period sequence generator 11, counter 16 and the flip-flop 13. The counter 16 performs its counting operation in order to find at which timing position an output of the maximal period sequence generator is in the Pn sequence having the period of $2^m$ and counts up for each chip inclusive of intentionally inserted 0s. An output of the counter 16 is supplied to a comparator 18 which generates a signal for changing over the selector 14. In a set switching value circuit 17, there is set a value which is different depending on an amount of shift. The set switching value circuit 17 is used for generating a signal which changes over the selector via the comparator 18.

The maximal period sequence of the pseudo noise, which is to be a base for forming PN signals, is hereinafter explained.

In the so-called CDMA Cellular system, spread spectrum communication is employed. In the spread spectrum communication in general, the transmitted information signal is multiplied with the pseudo noise broader in the frequency range than the transmitted information signal. Such pseudo noise is termed the PN code in spread spectrum of the direct spread system, such as the CDMA system Cellular. It is the maximal period sequence that is used most frequently in the pseudo noise. FIG. 2 shows an example of the maximal period sequence generator. The circuit shown in FIG. 2 is one of the circuits employed in the so-called CDMA system Cellular. The generating polynomial of the maximal period sequence generator shown in FIG. 2 is given by $$P(x) = X^{15} + X^{13} + X^9 + X^8 + X^7 + X^5 + 1$$

Figure 3A:
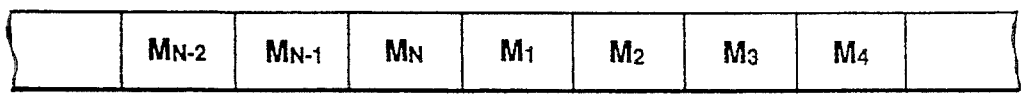
FIGS. 3A and 3B are diagrammatic views for illustrating the difference between the maximal period sequence and the PN code employed in the CDMA system Cellular.
Figure 3B:
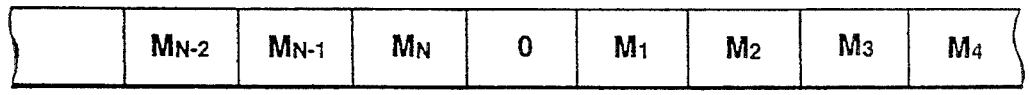

If the circuit shown in FIG. 2 is in operation continuously, its output values or its inner operating states are of the usual maximal period sequence as shown at A in FIG. 3. If the number of orders of the maximal period sequence, corresponding to the number of registers RG in the circuit of FIG. 2, is m, the maximal period sequence has a period equal to $2^m - 1$. In the example of FIG. 2, since 15 registers RG1 to RG15 and exclusive OR gates EX1 to EX5 are connected in series, the maximal period sequence has a period equal to $2^{15} - 1$.

Figure 4:
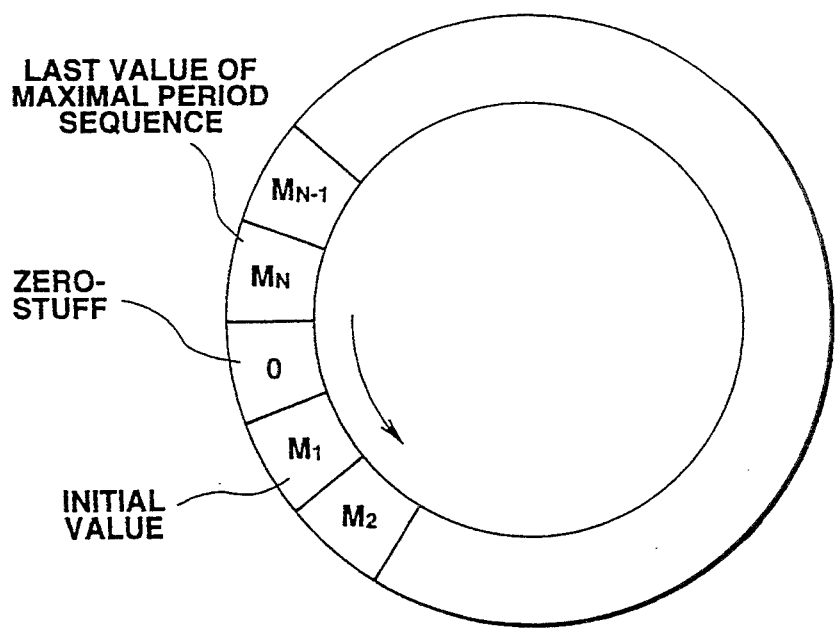
FIG. 4 is a diagrammatic view for illustrating periodicity of the PN code employed in the CDMA system Cellular.
Figure 6A:
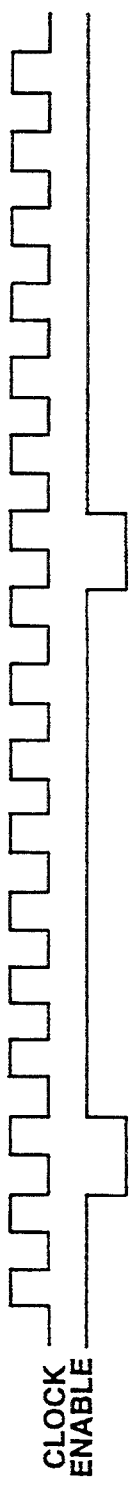
FIGS. 6A through 6D are waveform diagrams illustrating a control method for advancing or retarding the maximal period sequence generator.
Figure 6B:
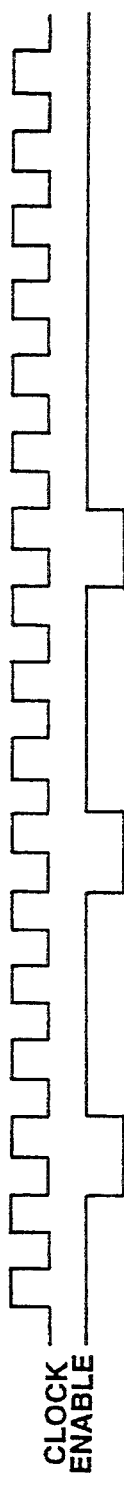
Figure 6C:
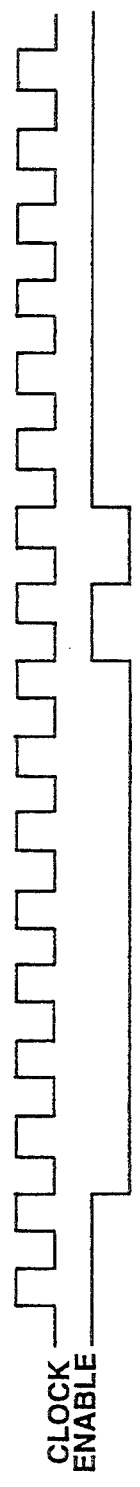
Figure 6D:
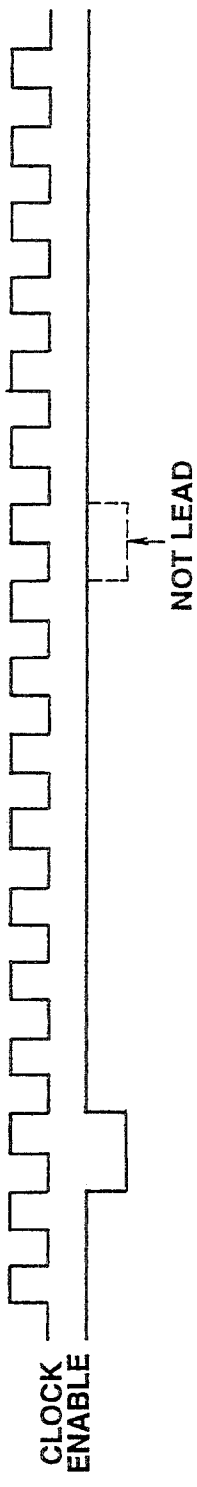

On the other hand, with the so-called CDMA system Cellular, the period is set to $2^m$, m being 15 in a practical example in view of system constraints. There is inserted the state of "0" as shown at B in FIG. 3. That is, in the so-called CDMA Cellular, after 14 consecutive "0" s, there is inserted a "0" as indicating the trailing end of the maximal period sequence. It is noted that, since the data from an output value $MN_{N-4}$ up to $M_N$ are "0", there are 15 consecutive "0" s. The PN code is a repetition of the sequence beginning from an initial value (initial state) $M_1$ and terminating at the inserted "0", as shown in FIG. 4. Such "0" insertion may be achieved by halting the generation of the maximal period sequence by one chip using an enabling signal as produced by a timing generator.

The temporal shifting of the maximal period sequence, employing vector multiplication, is hereinafter explained.

If the status vector of the maximal period sequence generator $V_N$, which is the vector having the status of each register RG of FIG. 2 as an element, is multiplied with another vector $V_S$, which is the time shift vector, a temporally shifted sequence M', as a scalar value, is obtained:

M' = $V_S V_M$

M' = status vector of the maximal period sequence generator $V_S$ = time shift vector M' = temporally shifted maximal period sequence With the maximal period sequence generator, shown in FIG. 2, the vector for shifting 64 chips is (1, 0, 1, 1, 1, 1, 0, 1, 0, 1, 0, 0, 0, 0, 1). For realizing the delays for $(2^m - 1)$ periods in their entirety, it is necessary to provide $(2^m -)1$ sets of shift vectors. The chip means each PN code, with the rate of the PN code being the chip rate. Meanwhile, since the time difference or offset (pilot-PN offset) of the PN code transmitted by each transmitting side or base station is based on 64 chips, it suffices if $2^m/64=2_{m-6}$ shift vector patterns are held on memory. If m is 15, 512 shift vector patterns need to be stored.

Multiplication of the status vector of the maximal period sequence generator by a certain vector produces temporal shifting or delay in a well-known manner. However, the PN code employed in the above-mentioned CDMA system Cellular cannot be directly applied because of the "0" insertion in the maximal period sequence.

FIG. 5 shows the PN code for the CDMA system Cellular, that is the PN code without delay at A and the sequence with delay of 4 chips at B and C, where the PN code with delay of 4 chips and the result of vector multiplication are shown at B and C, respectively. That is, FIGS. 5A, 5B and 5C show an output of the PN code generator taking advantage of the maximal period sequence generator, a signal delayed by 4 chips and the result of vector multiplication by a conventional method for producing a delay, respectively.

If shifting is achieved by vector multiplication as shown at C in FIG. 5, the value $M_{i-4}$ is produced for the original value $M_i$, so that the resulting sequence differs from the sequence which is really desired, that is the sequence shown at B in FIG. 5. This is due to the fact that "0" is intentionally inserted in the maximal period sequence. If the delay traverses this "0", the result of vector multiplication is in error. For example, if the value $M_5$ in the sequence shown at A in FIG. 5, the value $M_1$ is produced, which does not traverse "0", so that the result of vector multiplication shown at C is correct. However, if the value $M_1$ in the sequence shown at A in FIG. 5 is delayed by 4 chips, it traverses "0", so that the result of vector multiplication shown at C becomes equal to $MN_{N-3}$, which differs from $M_{N-2}$ shown at B in FIG. 5 and hence is not correct. Meanwhile, since the maximal period sequence generator is halted during "0" insertion in the sequence shown at A in FIG. 5, the result of vector multiplication represents a repetition of the same value (the previous value $M_{N-4}$) as indicated by arrow in FIG. 5.

It is for obviating such inconvenience that the PN code generator as shown in FIG. 1 is proposed.

Reverting to FIG. 1, the timing generator 15 is explained.

For advancing the maximal period sequence generator, it is necessary to employ a number of clocks equal to an integer number of times of the clocks employed for usual operations, in order to assure a faster operation. Such state is shown in FIGS. 6A to D. In the example of FIG. 6, the clocks having a clock rate equal to 8 times the usual clock rate are employed, such that the maximal period sequence generator is actuated for every eighth clock during the usual operation. Although the registers and flip-flops in the maximal period generator are of the synchronous type employing enable signals, these may also be of the asynchronous type in which the number of clocks supplied during each chip period is changed. For advancing the maximal period sequence generator, an additional enable signal is introduced between enabling signals generated during the usual operation for assuring a high-speed operation. In the example of FIG. 6 the enable signal is active-low.

Since 7 enable signals at the maximum may be inserted between the usual enable signals, the sequence may be increased in rate by a factor of 7 at the maximum. If the sequence has a period of 27 ms, it may be increased to a maximum rate of 3.8 ms The generator may be shifted to any desired timing positions. If the rate is to be decreased, the maximal period sequence generator is halted by not transmitting the enable signal which is transmitted during the usual operation. The enable signal is omitted once for each chip such that 27 ms at the maximum is required in a 27 ms sequence in order to achieve shifting to any arbitrary timing position. "0" insertion is realized using this delay technique. The last value $M_N$ in the maximal period sequence employed in the CDMA system Cellular is "0". The usual operation is halted once when the value $M_N$ is outputted for realizing the "0" insertion. To this end, the timing generator 15 omits the enable once at the last timing position of the sequence based on the value of the counter 16 or when 14 "0" s appear consecutively at an output of the maximal period sequence generator 11, thereby achieving "0" insertion.

The method for realizing temporal shift of the maximal period sequence using vector multiplication is now explained. In the present example, delay of 4 chips is to be achieved.

First, 3-chip delay is made using vector multiplication. The reason the delay is not 4 chips is that, since the selector 14 selects the result of the vector multiplier 12 or the result delayed further by one chip using a flip-flop, a 1-chip delay is introduced, so that a sequence having a lead of one chip as compared to the desired shift quantity is required as the result of multiplication. Consequently, if no shift is made, the output of the vector multiplier 12 need to have a lead of one chip. For producing a sequence having a lead of one chip as compared to the desired shift value as the result of multiplication, the shift vector value is advanced by one chip or the maximal period sequence is advanced by one chip. The former method is employed in the present example.

In FIGS. 7A to E, an output of the maximal period sequence generator 11, an output of the vector multiplier 12, an output of the flip-flop 13, an output of the selector 14 and an output of the comparator 18 which is a changeover control signal for the selector 14 are shown, respectively.

Since the maximal period sequence generator 11 is delayed by one chip when "0" is inserted by the maximal period sequence generator 11, the output of the vector multiplier 12 is maintained at a directly previous value $M_{N-3}$. That is, the state $M_{N-5}$ is inserted at this time point and subsequently the one-chip shift is sustained until the time of outputting the initial value $M_1$. Comparison of such sequence with the desired 4-chip delay sequence, which is the selector output shown at D in FIG. 7, indicates that coincidence is maintained since the time point of "0" insertion until the last value $M_N$ of the sequence and that one-chip shift is caused before 0 insertion and after the initial value $M_1$. On the other hand, the flipflop output is maintained at $M_{N-4}$ at the time point of 0 insertion so that one-chip delay is produced. Comparison with the desired 4-chip delay signal indicates that coincidence is maintained before 0 insertion and the last value $M_N$ of the sequence of the flipflop output and that one-chip shift is produced since the time point of 0 insertion until the value $M_{N-1}$.

By taking advantage of the above properties, a changeover signal for the selector 14 is generated as shown at E in FIG. 7, and an output of the vector multiplier 21 shown at B in FIG. 7 and an output of the flipflop 13 are selected for the high level "H" and the low level "L" of the changeover signal, respectively, for generating a signal delayed by 4 chips from the PN signal, as employed in the CDMA system Cellular, shown at D in FIG. 7. Such changeover signal is produced by comparing the value $N_C$ of the counter and the pre-set changeover value $N_S$. If the maximal period sequence generator 11 outputs the inserted "0" and the counter has a value of 0 (1 and 2 for the values $M_1$ and $M_2$, respectively), and if the following condition:

$$0 \leq N_C < N_S$$

where $N_S$ stands for shift quantity which is 4 for a 4-chip shift, is satisfied, the comparator 18 outputs "H".

By employing the above circuit, the PN code employed in the CDMA system Cellular may be shifted using the vector multiplication, so that the sequence shifted one chip after setting the shift vector is produced. Thus it becomes possible to produce a sequence shifted in a shorter time than when the maximal period sequence generator 11 is actually advanced or retarded.

However, if such means is utilized in order to have the vector having the PN sequence period of $2^m$, which is $2^{15}$ for the CDMA Cellular, the circuit scale tends to be increased. If the vector equal to the shift between the base stations, which is 512 with the so-called CDMA Cellular in which the shift quantity of the PN code transmitted by the base station is based on 64 chips, and the time difference based on the difference in the propagation distance from each base station is adjusted by actually advancing or retarding the maximal period sequence generator 11, the temporal shift of the PN sequence may be achieved in a shorter time without excessively increasing the circuit scale. Since the propagation time from the base station is 20 chips at the maximum, the time for advancing or delaying the 20 chip maximal period sequence generator 11 is required. The effect is outstanding because the shift up to a maximum value of 32767 ($=2^m-1$) is required if the maximal period sequence generator 11 is to be advanced or retarded without employing vector multiplication.

FIGS. 8A to C illustrate the time difference in the PN code between the base stations i and 2. The base stations 1 and 2 transmit the PN code with a time difference of 64 chips, that is the base station 2 has a lag of 64 chips from the base station 1. In addition, since the base station 2 is further away than the base station as viewed from the moving terminal, a 2 chip delay is additionally produced, totaling at a 66 chip delay. There are 512 timing positions of transmission of the PN codes from the base stations for a period of $2^{15}$ at an interval of 64 chips. In the present example, the PN code is as shown at A in FIG. 8 during reception of the base station 1. If the base station 1 is to be changed over to the base station 2, 64 chip delay is introduced by a method utilizing vector multiplication and the remaining 2 chip delay is introduced by retarding the PN code generator by two chips for matching the timing. FIG. 8C shows the PN code delayed by two chips.

The above description of the preferred embodiments of the present invention may be summarized as follows:

(i) The delay means for the maximal period sequence employing vector multiplication has 512 sets associated with the pilot-PN offsets. Although this renders it impossible to produce the delay for each of $2^{15}-1$ periods, the memory table for storage of the shift vectors may be reduced in size to 1/64.

(ii) The delay quantity that cannot be produced by vector multiplication may be adjusted and realized by a technique of increasing the rate of or halting the operation of the firstly stated circuit.

This method is actually convenient. The timings of the PN pilot code transmitted by the base station are arrayed at an interval equal to an integer number times of 64 chips. The difference in the time shift quantity in the pilot PN code with different base stations is coped with by vector multiplication, while propagation delay from the base station is coped with by advancing and/or retarding the generator. It may be contemplated that a change in the delay time by the vector multiplier may be achieved almost instantly, that is within about 2 µs, while the temporal distribution of the pilot PN code by propagation delay is within approximately 20 µs, so that timing matching may be achieved within 25 µs at the maximum and within 12,5 µs on an average.

What is claimed is:

1. A method for generating a PN code for spread spectrum communication comprising
    a maximal period sequence generating step of generating a maximal period sequence which is to be the base of the PN code and in which a code 0 is inserted at some position in the sequence,
    a vector producing step of finding the delay time of the PN code required in the spread spectrum communication as a shift vector value,
    a first maximal period sequence outputting step of multiplying the vector having the state of each register of the maximal period sequence generating step as an element by said shift vector for outputting the temporally shifted first maximal period sequence,
    a second maximal period sequence outputting step of outputting a second maximal period sequence delayed further by one PN rate from said first maximal period sequence, and
    a selecting step of outputting a PN code by changing over the first maximal period sequence to the second maximal period sequence or vice versa at a timing as set from outside.

2. The method for generating the PN code as claimed in claim 1 wherein said shift vector at the vector producing step is a vector corresponding to the time difference in the PN codes transmitted by plural transmitting sides.

3. The method for generating the PN code as claimed in claim 2 further comprising
    an adjustment step of adjusting the propagation delays from the plural transmitting sides to the receiving side by advancing or retarding the generation of said maximal period sequence.

4. An apparatus for generating a PN code for spread spectrum communication comprising
    maximal period sequence generating means for generating a maximal period sequence which is to be the base of the PN code and in which a code 0 is inserted at some position in the sequence,
    vector producing means for finding the delay time of the PN code required in the spread spectrum communication as a shift vector value,
    first maximal period sequence outputting means for multiplying the vector having the state of each register of the maximal period sequence generating step as an element by said shift vector for outputting the temporally shifted first maximal period sequence, second maximal period sequence outputting means for outputting a second maximal period sequence delayed further by one PN rate from said first maximal period sequence, and selecting means for outputting a PN code by changing over the first maximal period sequence to the second maximal period sequence or vice versa at a timing as set from outside.

5. The apparatus for generating the PN code as claimed in claim 4 wherein said vector producing means store only those vectors which are associated with the time difference of each PN code transmitted by each of plural transmitting sides.

6. The apparatus for generating the PN code as claimed in claim 5 further comprising adjustment means for adjusting the propagation delays from the plural transmitting sides to the receiving side by advancing or retarding the generation of said maximal period sequence.

* * * * *

UNITED STATES PATENT AND TRADEMARK OFFICE
CERTIFICATE OF CORRECTION

PATENT NO. : 5,438,596

DATED : AUGUST 1, 1995

INVENTOR(S): TAKEHIRO SUGITA

It is certified that error appears in the above-identified patent and that said Letters Patent is hereby corrected as shown below:

On title page, item [54] and col. 1,
In the Title of the Invention, change "METHOD AND APPARATUS FOR GENERATING DIFFUSION CODE" to --METHOD AND APPARATUS FOR GENERATING PN CODE--;

Column 1, Line 17, change "(diffused)" to --(spread)--;

Column 6, Line 59, change "M'" to --$V_M$--;

Column 7, Line 4, change "$2_{m-6}$" to --$2^{m-6}$--.

Signed and Sealed this

Fifth Day of December, 1995

Attest:

Attesting Officer

BRUCE LEHMAN

Commissioner of Patents and Trademarks